US012462997B2

(12) United States Patent
Galayda (10) Patent No.: US 12,462,997 B2
(45) Date of Patent: Nov. 4, 2025

(54) CONFIGURABLE ELECTRICAL DISTRIBUTION PANEL

(71) Applicant: Steamrock Inc., Kaohsiung (TW)

(72) Inventor: Mikhail Galayda, Kaohsiung (TW)

(73) Assignee: STEAMROCK INC., Kaohsiung (TW)

( * ) Notice: Subject to any disclaimer, the term of this patent is extended or adjusted under 35 U.S.C. 154(b) by 431 days.

(21) Appl. No.: 18/202,968

(22) Filed: May 29, 2023

(65) Prior Publication Data

US 2024/0404776 A1 Dec. 5, 2024

(51) Int. Cl.
*H01H 71/02* (2006.01)
*H01H 71/04* (2006.01)
*H01H 71/08* (2006.01)

(52) U.S. Cl.
CPC ........ *H01H 71/0228* (2013.01); *H01H 71/04* (2013.01); *H01H 71/082* (2013.01)

(58) Field of Classification Search
CPC ... H01H 71/0228; H01H 71/04; H01H 71/082
USPC .......................................................... 361/64
See application file for complete search history.

(56) References Cited

U.S. PATENT DOCUMENTS

| 6,788,508 B2 * | 9/2004 | Papallo, Jr. .......... H01H 71/123 361/64 |
| 11,646,571 B2 * | 5/2023 | Hallam .................... H02H 7/22 361/91.1 |
| 2018/0205206 A1 * | 7/2018 | Bazhinov ................ H02B 1/066 |
| 2021/0083506 A1 * | 3/2021 | Rao ......................... G01R 21/06 |
| 2023/0069678 A1 * | 3/2023 | Madonna .......... H02J 13/00036 |
| 2024/0222040 A1 * | 7/2024 | Mittelstadt ............... H01H 3/26 |

* cited by examiner

*Primary Examiner* — Kevin J Comber
(74) *Attorney, Agent, or Firm* — Min-Lee Teng (57) ABSTRACT

A configurable electrical distribution panel, comprising: circuit breakers; a panel, for operating on/off switches of the circuit breakers, wherein each circuit breaker has a corresponding EPD (Electronic Paper Display) for displaying information associated with the circuit breaker; and a control circuit, wherein the control circuit can obtain a corresponding amount of current flowing through each circuit breaker via a corresponding current sensor and displaying each obtained amount of current on a corresponding EPD, respectively.

19 Claims, 10 Drawing Sheets

CONFIGURABLE ELECTRICAL DISTRIBUTION PANEL

BACKGROUND OF THE INVENTION

1. Field of the Invention

The invention relates to an electrical distribution panel, and in particular, but not exclusively, to a configurable electrical distribution panel.

2. Description of the Prior Art

When AC or DC power is used in a system with one or more circuit branches, individual switch or circuit breaker protection is used for each circuit branch. Typically, they are labeled individually with a sticker label or in writing on the panel surface. Power consumption is typically monitored for the whole system. It would be useful, especially for the systems with limited power supply (such as boats, motorhomes, etc.) to monitor each branch, which will help control the power budget and discover early signs of equipment or wiring malfunction, and have a convenient means of labeling and/or reassigning the branch names in case of adding new equipment or replacing existing one.

Therefore, a new solution is needed for a new electrical distribution panel.

SUMMARY OF THE INVENTION

One objective of the present invention is to provide a configurable electrical distribution panel, wherein all the circuit branch names, circuit breakers capacity (amperage), and language can be easily configured (assigned or reassigned) by the user electronically without changing any part of the panel. These settings (configuration) can be saved in a non-volatile memory of the control circuit of the configurable electrical distribution panel.

One objective of the present invention is to provide a configurable electrical distribution panel to monitor the amount of current flowing through each circuit branch and discover early signs of equipment or wiring malfunction.

One objective of the present invention is to provide a configurable electrical distribution panel that can change the background color of a display area to indicate that the circuit branch corresponding to the display area is energized.

The present invention discloses a configurable electrical distribution panel, comprising: a plurality of circuit breakers, wherein each circuit breaker is used to control a corresponding circuit branch, wherein each circuit breaker comprises a first terminal, a second terminal and an on/off switch, wherein when the on/off switch is on, the first terminal is electrically connected to the second terminal for conducting a current through the circuit breaker: a plurality of current sensors, wherein each current sensor is coupled to a corresponding circuit branch for measuring the amount of current flowing through the circuit branch: a panel, for operating the plurality of on/off switches, wherein at least one EPD (Electronic Paper Display) separated from the plurality of circuit breakers is disposed on the panel, wherein each on/off switch has a corresponding EPD (Electronic Paper Display) for displaying information associated with the corresponding circuit breaker of the on/off switch; and a control circuit, comprising a plurality of electronic devices that are electrically connected, wherein the control circuit is capable of detecting each circuit breaker state (ON or OFF), obtaining a corresponding amount of current flowing through each circuit branch (if its circuit breaker is ON) of the plurality of circuit branches via a corresponding current sensor(s) and displaying each obtained amount of current along with a circuit branch name on a corresponding EPD of the circuit breaker, respectively.

In one embodiment, the configurable electrical distribution panel comprises a PCB (Printed Circuit Board), wherein the plurality of electronic devices are disposed on the PCB for forming the control circuit.

In one embodiment, the plurality of current sensors are disposed on at least one sensor board that is electrically coupled to the PCB.

In one embodiment, the sensor board is connected to the terminals of the circuit breakers via a bus bar, wherein a power supply is connected to the bus bar via a power cable.

In one embodiment, the sensor board is attached to a bus bar for performing contactless measurements of the current flowing through each of the circuit breakers, wherein a power supply is connected to the bus bar via a power cable.

In one embodiment, the first terminal of a first circuit breaker is electrically connected to a power supply via a bus bar, and the second terminal of the first circuit breaker is electrically connected to a first load on a boat, wherein when a first on/off switch of the first circuit breaker is turned on, the control circuit obtains a first amount of current flowing through the first circuit breaker and displays the first amount of current along with a circuit branch name on a first display area of the at least one EPD of the first on/off switch with the background color of the first display area of the at least one EPD being changed from black to white to indicate that the circuit branch corresponding to the first circuit breaker is energized.

In one embodiment, the first terminal of a first circuit breaker is electrically connected to a power supply via a bus bar, and the second terminal of the first circuit breaker is electrically connected to a first load on a motorhome, wherein when a first on/off switch of the first circuit breaker is turned on, the control circuit obtains a first amount of current flowing through the first circuit breaker and displays the first amount of current along with a circuit branch name on a first display area of the at least one EPD of the first on/off switch with the background color of the first display area of the at least one EPD being changed from black to white to indicate that the circuit branch corresponding to the first circuit breaker is energized.

In one embodiment, the first terminal of a second circuit breaker is connected to a power supply via a bus bar, and the second terminal of the second circuit breaker is connected to a second load on the boat, wherein when a second on/off switch of the second circuit breaker is turned on, the control circuit obtains a second amount of current flowing through the second circuit breaker and displays the second amount of current along with a circuit branch name on a second display area of the at least one EPD of the second on/off switch with the background color of the second display area of the at least one EPD being changed from black to white to indicate that the circuit branch corresponding to the second circuit breaker is energized.

In one embodiment, the first terminal of a second circuit breaker is connected to a power supply via a bus bar, and the second terminal of the second circuit breaker is connected to a second load on the motorhome, wherein when a second on/off switch of the second circuit breaker is turned on, the control circuit obtains a second amount of current flowing through the second circuit breaker and displays the second amount of current along with a circuit branch name on a second display area of the at least one EPD of the second on/off switch with the background color of the second display area of the at least one EPD being changed from black to white to indicate that the circuit branch corresponding to the second circuit breaker is energized.

In one embodiment, the power supply is a DC power supply.

In one embodiment, the power supply is an AC power supply.

In one embodiment, the configurable electrical distribution panel comprises a plurality of voltage sensors, wherein each voltage sensor is electrically connected to a corresponding circuit breaker for measuring a voltage at a terminal of the circuit breaker.

In one embodiment, the on/off switch is a toggle switch, a button switch, a rocker switch, or a rotary switch.

In one embodiment, a first EPD corresponding to a first on/off switch and a second EPD corresponding to a second on/off switch are two separate EPD(s).

In one embodiment, the at least one EPD comprises a single EPD for displaying information associated with the plurality of circuit breakers, wherein each circuit breaker has a corresponding area of said single EPD for displaying information associated with the circuit breaker.

In one embodiment, the control circuit updates the EPD according to information received from an external device via a wireless connection established between the control circuit and the external device.

In one embodiment, the external device is a smartphone, wherein an APP (Application) running on the smartphone communicates with the control circuit via the wireless connection for configuring a panel and updating the EPD.

In one embodiment, an APP (Application) running on a computer communicates with the control circuit via a data cable or wireless connection for configuring a panel and updating the EPD.

In one embodiment, an APP (Application) running on a dedicated device communicates with the control circuit via a data cable or wireless connection for configuring a panel and updating the EPD.

In one embodiment, the APP sends information for displaying on the EPD in a language selected through a user interface of the APP.

In one embodiment, the APP is capable of configuring the at least one EPD into a plurality of display areas and assigning a corresponding branch name for each circuit breaker for displaying on a corresponding display area of the circuit breaker.

In one embodiment, the control circuit comprises an interface for forming a daisy chain connection with another configurable electrical distribution panel(s), so that several panels can be interconnected for data exchange and control.

In one embodiment, when the amount of current flowing through a circuit breaker exceeds a predefined threshold of the circuit breaker, an alarm is generated by the control circuit and a warning symbol or message can be displayed on the corresponding EPD.

The detailed technology and preferred embodiments implemented for the present invention are described in the following paragraphs accompanying the appended drawings for people skilled in this field to well appreciate the features of the claimed invention.

BRIEF DESCRIPTION OF DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF EMBODIMENT

The detailed explanation of the present invention is described as follows. The described preferred embodiments are presented for purposes of illustrations and description, and they are not intended to limit the scope of the present invention.

Figure 1A:
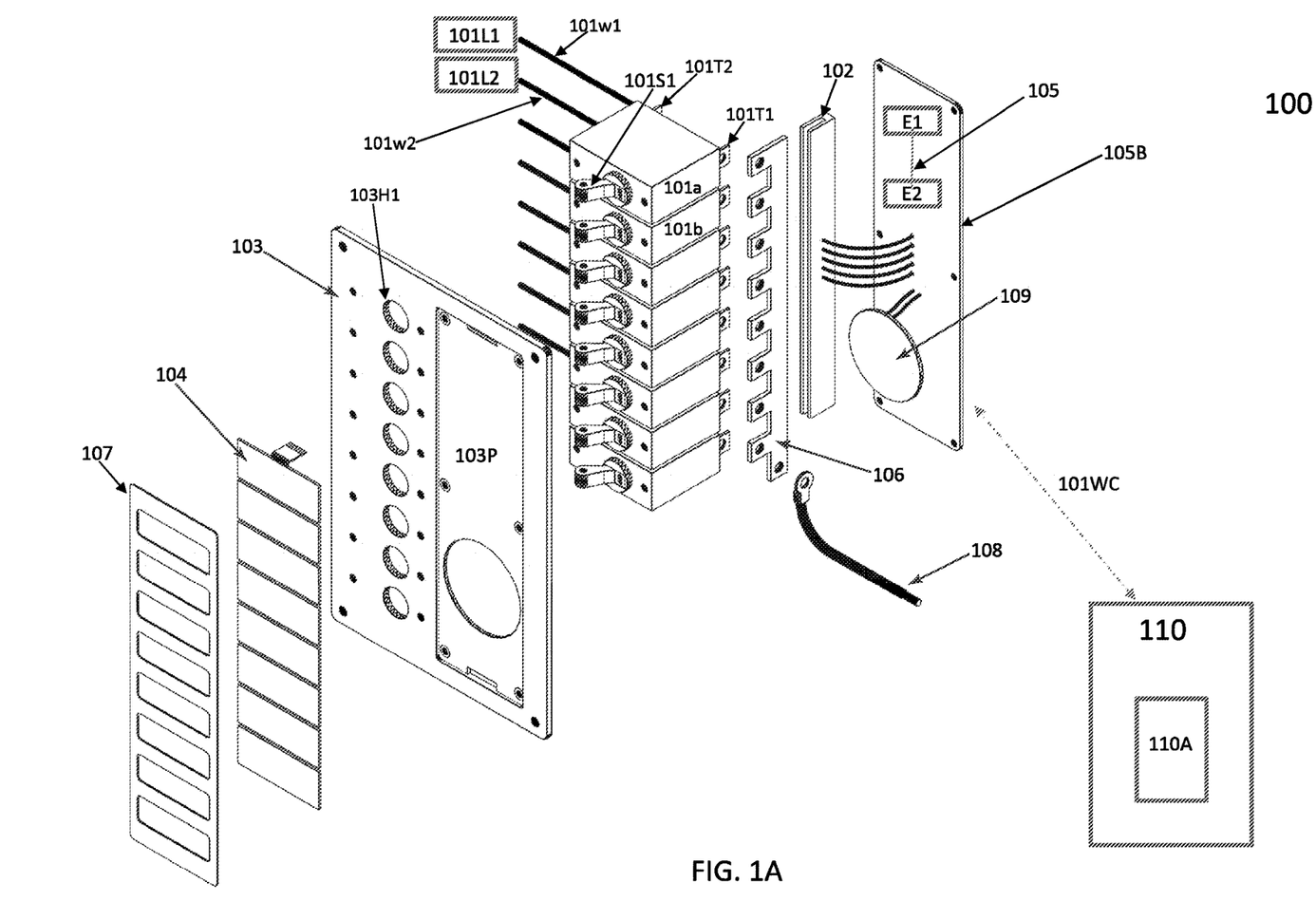
FIG. 1A illustrates an exploded view of a configurable electrical distribution panel according to one embodiment of the present invention.
Figure 1B:
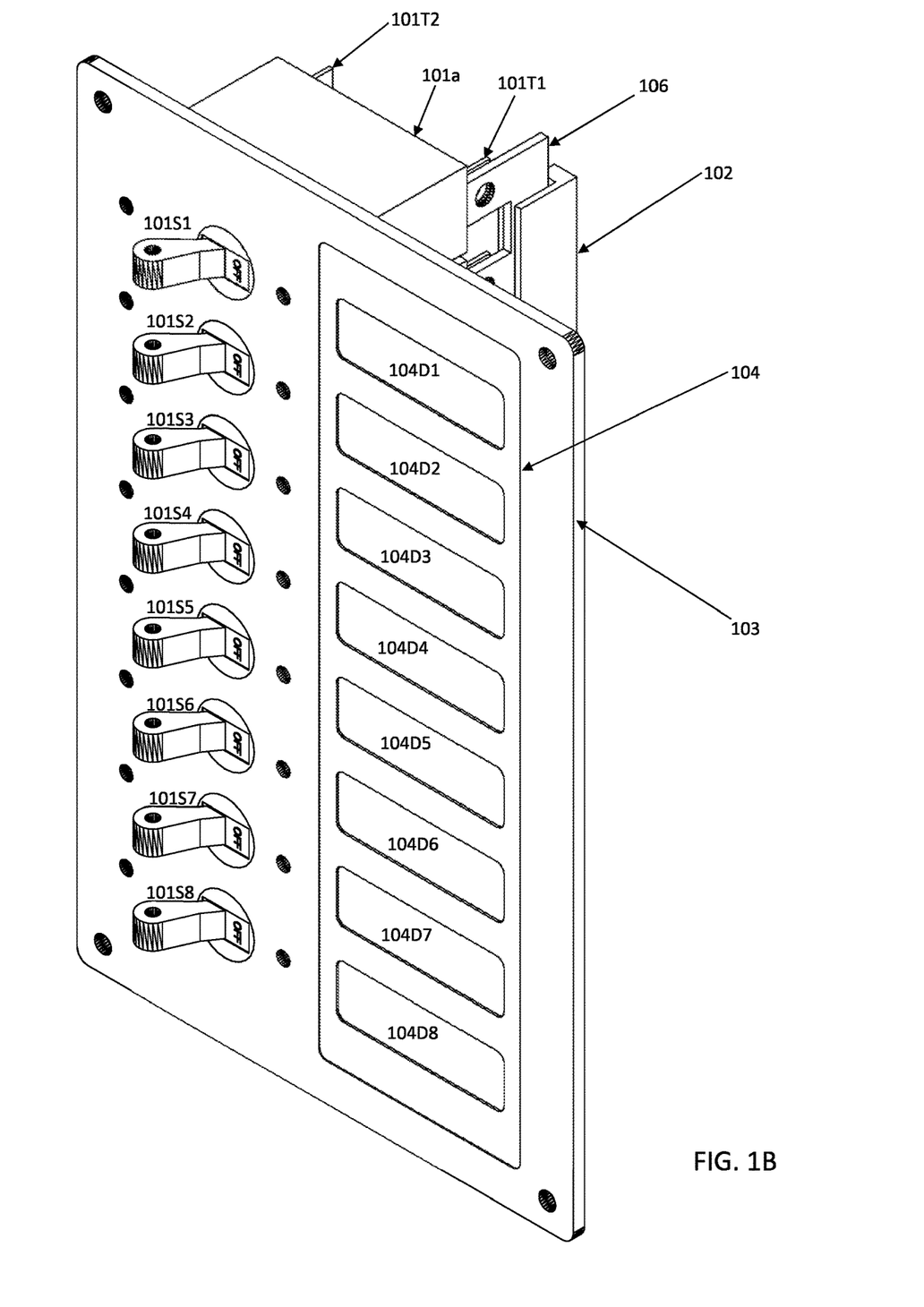
FIG. 1B illustrates a 3D view of the configurable electrical distribution panel according to one embodiment of the present invention.
Figure 1C:
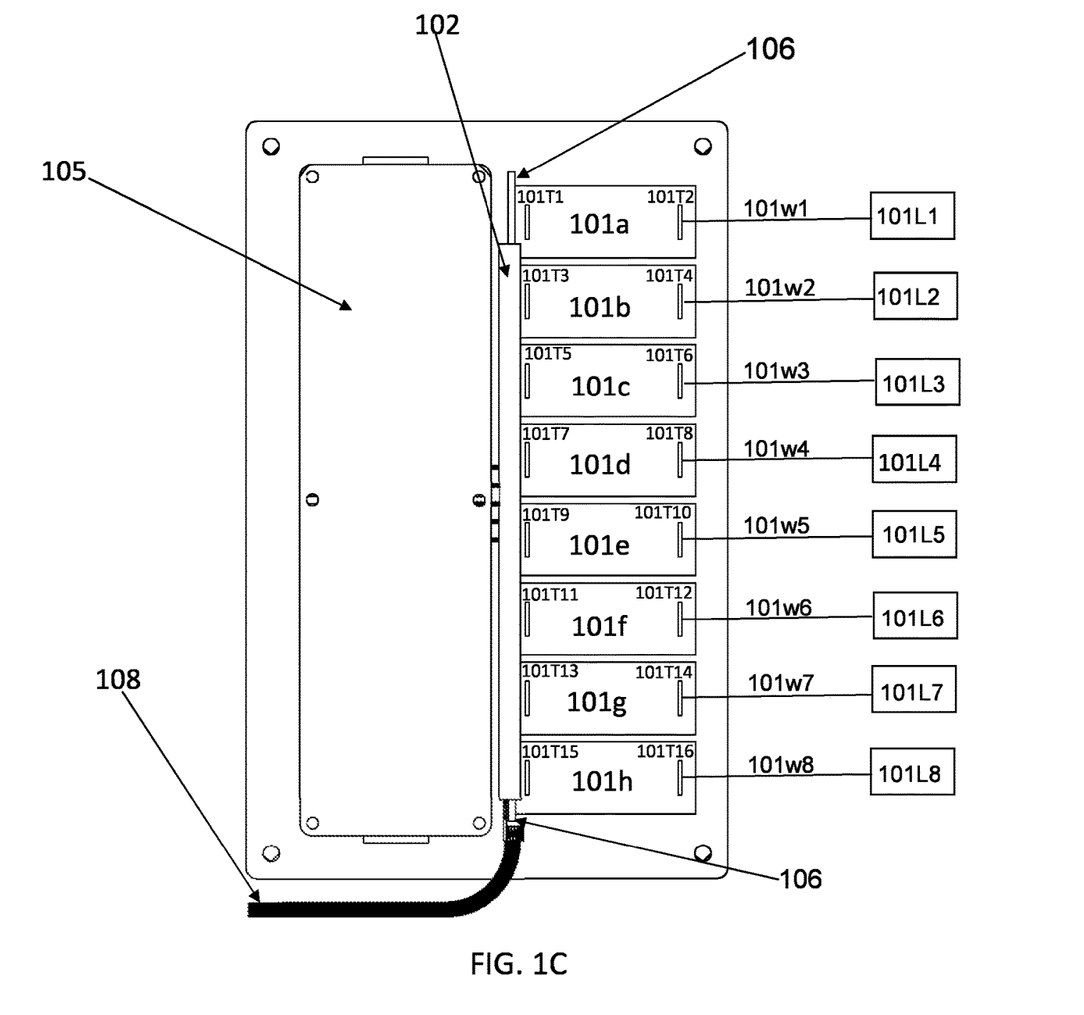
FIG. 1C illustrates a rear view of the configurable electrical distribution panel according to one embodiment of the present invention.

FIG. 1A illustrates an exploded view of a configurable electrical distribution panel 100 according to one embodiment of the present invention; FIG. 1B illustrates a 3D view of the configurable electrical distribution panel 100 according to one embodiment of the present invention; FIG. 1C illustrates a rear view of the configurable electrical distribution panel 100 according to one embodiment of the present invention; and FIG. 1D illustrates a side view of the configurable electrical distribution panel 100 according to one embodiment of the present invention.

Figure 1D:
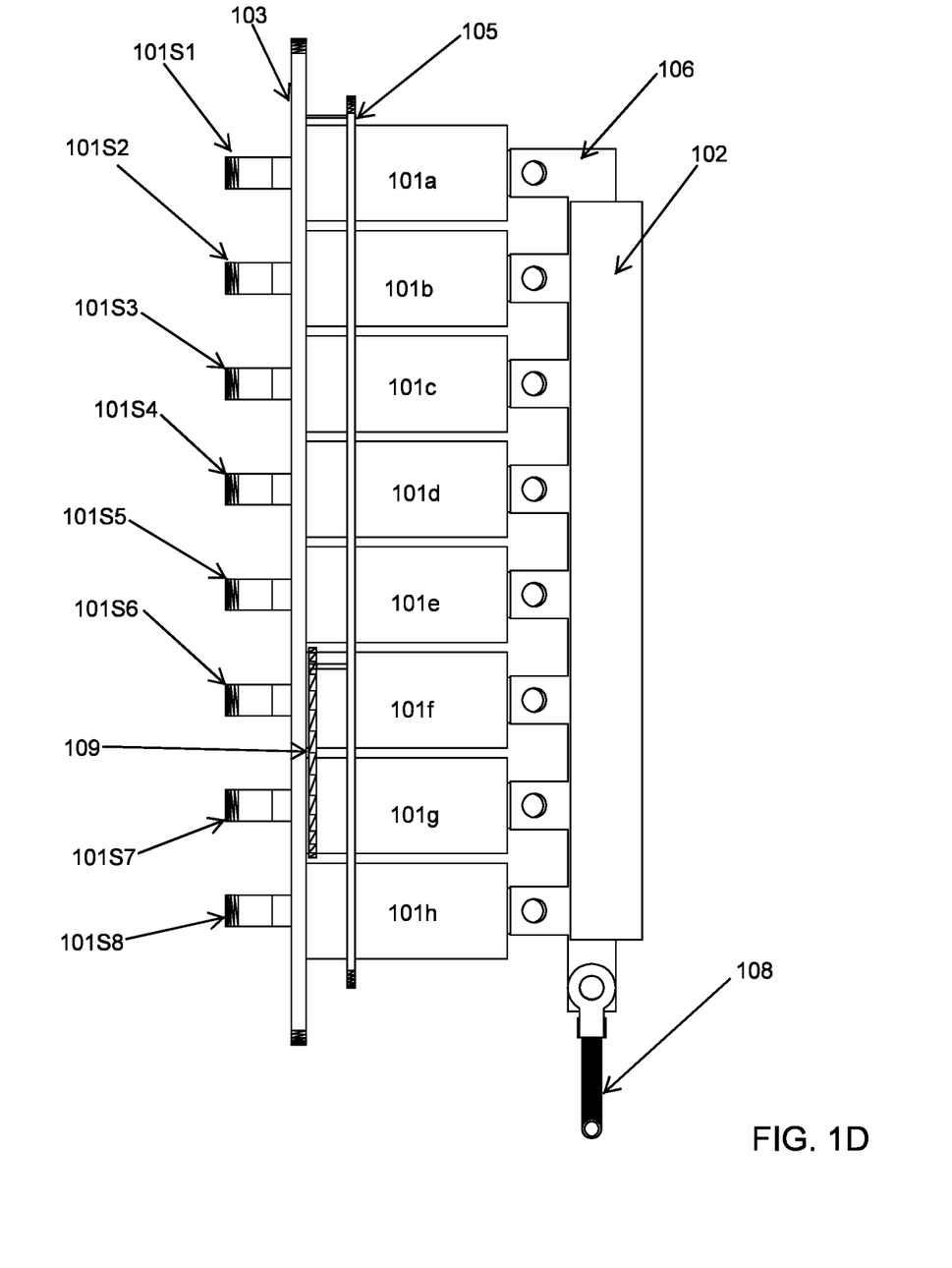
FIG. 1D illustrates a side view of the configurable electrical distribution panel according to one embodiment of the present invention.

Please refer to FIG. 1A-1D, wherein the configurable electrical distribution panel 100 comprises: a plurality of circuit breakers 101a, 101b, 101c, 101d, 101e, 101f, 101g, 101h, wherein each circuit breaker comprises a first terminal 101T1, 101T3, 101T5, 101T7, 101T9, 101T11, 101T13, 101T15, a second terminal 101T2, 101T4, 101T6, 101T8, 101T10, 101T12, 101T14, 101T16, and an on/off switch 101S1, 101S2, 101S3, 101S4, 101S5, 101S6, 101S7, 101S8, as shown in FIG. 1C and FIG. 1D, wherein when an on/off switch 101S1 is on, the first terminal 101T1 of the on/off switch 101S1 is electrically connected to the second terminal 101T2 of the on/off switch 101S1 for conducting a current through the corresponding circuit breaker 101a of the on/off switch 101S1. The configurable electrical distribution panel 100 further comprises a plurality of current sensors 102, wherein each current sensor is coupled to a corresponding circuit breaker for measuring the amount of current flowing through the circuit breaker. The configurable electrical distribution panel 100 further comprises a panel 103, for operating the plurality of on/off switches, wherein at least one EPD (Electronic Paper Display) 104 that is separated from the plurality of circuit breakers is disposed on the panel 103, wherein each on/off switch has a corresponding EPD (Electronic Paper Display) for displaying information associated with the corresponding circuit breaker of the on/off switch, as shown in FIG. 1B. The configurable electrical distribution panel 100 further comprises a control circuit 105 comprising a plurality of electronic devices E1, E2 that are electrically connected, as shown in FIG. 1A, wherein the control circuit 105 is capable of obtaining a corresponding amount of current flowing through each circuit breaker of the plurality of circuit breakers via a corresponding current sensor and displaying each obtained amount of current on a corresponding EPD of the circuit breaker, respectively.

In one embodiment, as shown in FIG. 1C, the plurality of circuit breakers 101*a*, 101*b*, 101*c*, 101*d*, 101*e*, 101*f*, 101*g*, 101*h* are capable of connecting with a plurality of load 101L1, 101L2, 101L3, 101L4, 101L5, 101L6, 101L7, 101L8 via wires 101*w*1, 101*w*2, 101*w*3, 101*w*4, 101*w*5, 101*w*6, 101*w*7, 101*w*8, respectively, as shown in FIG. 1C.

In one embodiment, wherein the at least one EPD (Electronic Paper Display) 104 can be mounted in a recessed area 103P of the panel 103, as shown in FIG. 1A.

In one embodiment, a frame 107 is disposed on the at least one EPD (Electronic Paper Display) 104, as shown in FIG. 1A.

In one embodiment, the configurable electrical distribution panel 100 comprises a PCB (Printed Circuit Board) 105B, wherein the plurality of electronic devices E1, E2 are disposed on the PCB 105B for forming the control circuit 105.

In one embodiment, the plurality of current sensors 102 are disposed on at least one sensor board that is electrically coupled to the PCB 105B.

In one embodiment, the first terminal 101T1 of a first circuit breaker 101*a* is electrically connected to a power supply 108, and the second terminal 101T2 of the first circuit breaker 101*a* is electrically connected to a first load 101L1, wherein when a first on/off switch 101S1 of the first circuit breaker 101*a* is turned on, the control circuit 105 obtains a first amount of current flowing through the first circuit breaker 101*a* and displays the first amount of current on a first display area of the at least one EPD of the first on/off switch 101S1 with the background color of the first display area of the at least one EPD being changed from black to white to indicate that the circuit branch corresponding to the first circuit breaker 101*a* is energized.

In one embodiment, the first load 101L1 is on a boat.

In one embodiment, the first load 101L1 is on a motorhome.

In one embodiment, the configurable electrical distribution panel comprises a plurality of voltage sensors, wherein each voltage sensor is electrically connected to a corresponding circuit breaker for measuring a voltage at a terminal of the circuit breaker.

In one embodiment, the on/off switch is a toggle switch.

In one embodiment, the on/off switch is a button switch, rocker switch, or rotary switch.

In one embodiment, the panel 103 has a through hole 103H1 for placing the on/off switch 101S1 on the front side of the panel 103.

In one embodiment, the control circuit 105 updates the at least one EPD 104 according to information received from an external device 110 via a wireless connection 101WC established between the control circuit 105 and the external device 110.

In one embodiment, the wireless connection 101WC is an NFC (Near-Field Communication) wireless connection.

In one embodiment, the wireless connection 101WC is a Wi-Fi, Bluetooth or LoRa wireless connection.

In one embodiment, the control circuit 105 updates the at least one EPD 104 according to information received from an external device 110 via a USB connection established between the control circuit 105 and the external device 110.

In one embodiment, the external device 110 is a smartphone.

In one embodiment, the external device 110 is a laptop.

In one embodiment, the external device 110 is a computer.

In one embodiment, the external device 110 is a tablet.

In one embodiment, an APP 101A running on the smartphone communicates with the control circuit 105 via the wireless connection 101WC for updating the at least one EPD 104.

In one embodiment, the APP 101A sends information for displaying on the at least one EPD 104 in a language selected through a user interface of the APP 101A.

In one embodiment, when the amount of current flowing through a circuit breaker exceeds a predefined threshold of the circuit breaker, an alarm is generated by the control circuit and a warning symbol or message can be displayed on the corresponding EPD.

In one embodiment, the APP 101A is capable of configuring a corresponding threshold of each circuit breaker for generating a corresponding alarm of the circuit breaker.

In one embodiment, an antenna 109 is disposed on the PCB for establishing a wireless connection with an external device.

As shown in FIG. 1B, a plurality of on/off switches 101S1, 101S2, 101S3, 101S4, 101S5, 101S6, 101S7, 101S8 are placed on the panel 103, and the at least one EPD 104 is divided into a plurality of display areas 104D1, 104D2, 104D3, 104D4, 104D5, 104D6, 104D7, 104D8, wherein each on/off switch has a corresponding display area of the at least one EPD 104 for displaying information associated with the corresponding circuit breaker of the on/off switch.

In one embodiment, the at least one EPD 104 has a single EPD, wherein the single EPD is divided into a plurality of display areas 104D1, 104D2, 104D3, 104D4, 104D5, 104D6, 104D7, 104D8 for displaying information associated with the plurality of circuit breakers 101*a*, 101*b*, 101*c*, 101*d*, 101*e*, 101*f*, 101*g*, 101*h*, wherein each on/off switch has a corresponding display area of the single EPD for displaying information associated with the corresponding circuit breaker of the on/off switch.

Figure 2A:
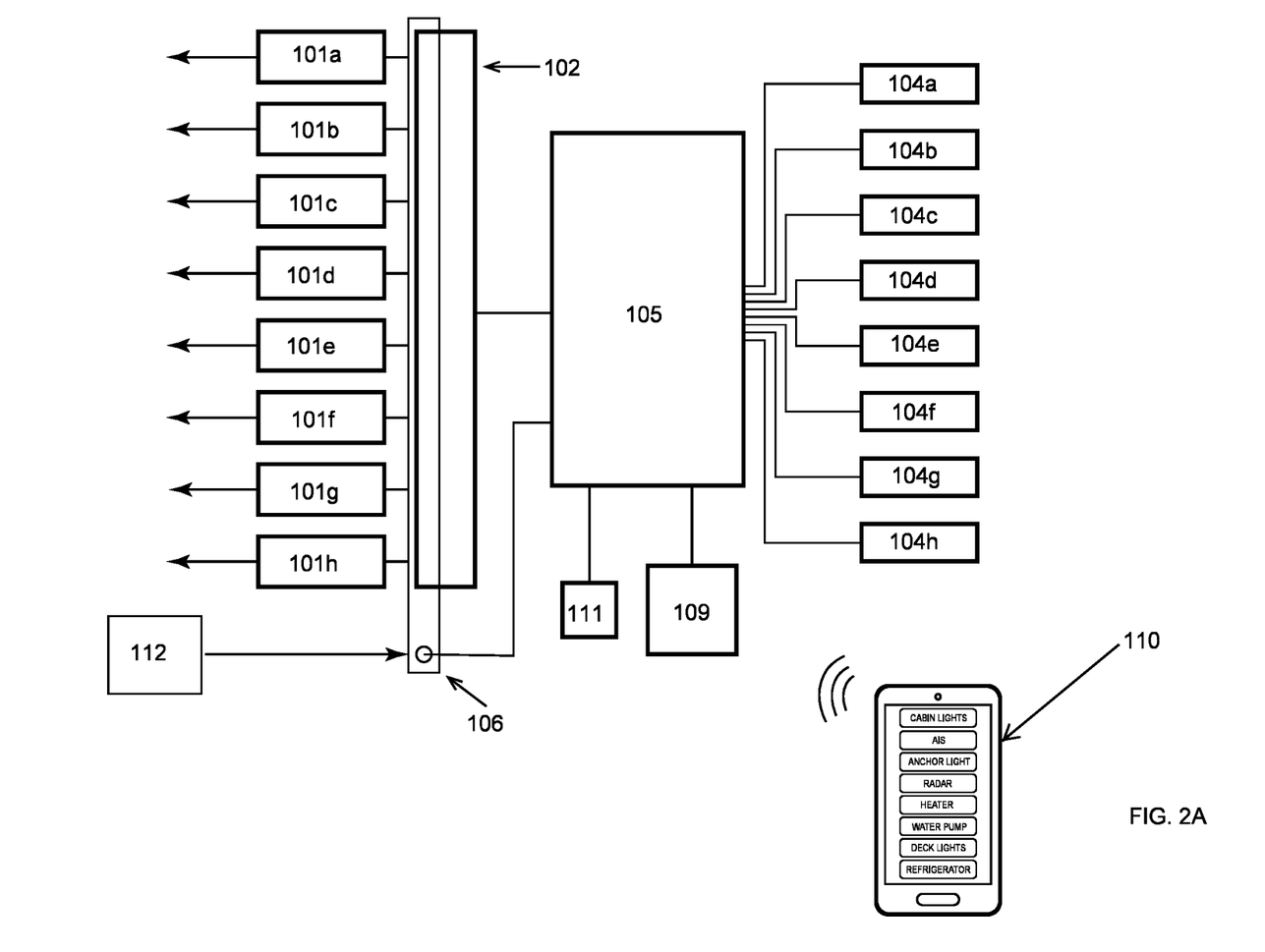
FIG. 2A illustrates a block diagram of a configurable electrical distribution panel according to one embodiment of the present invention.
Figure 2B:
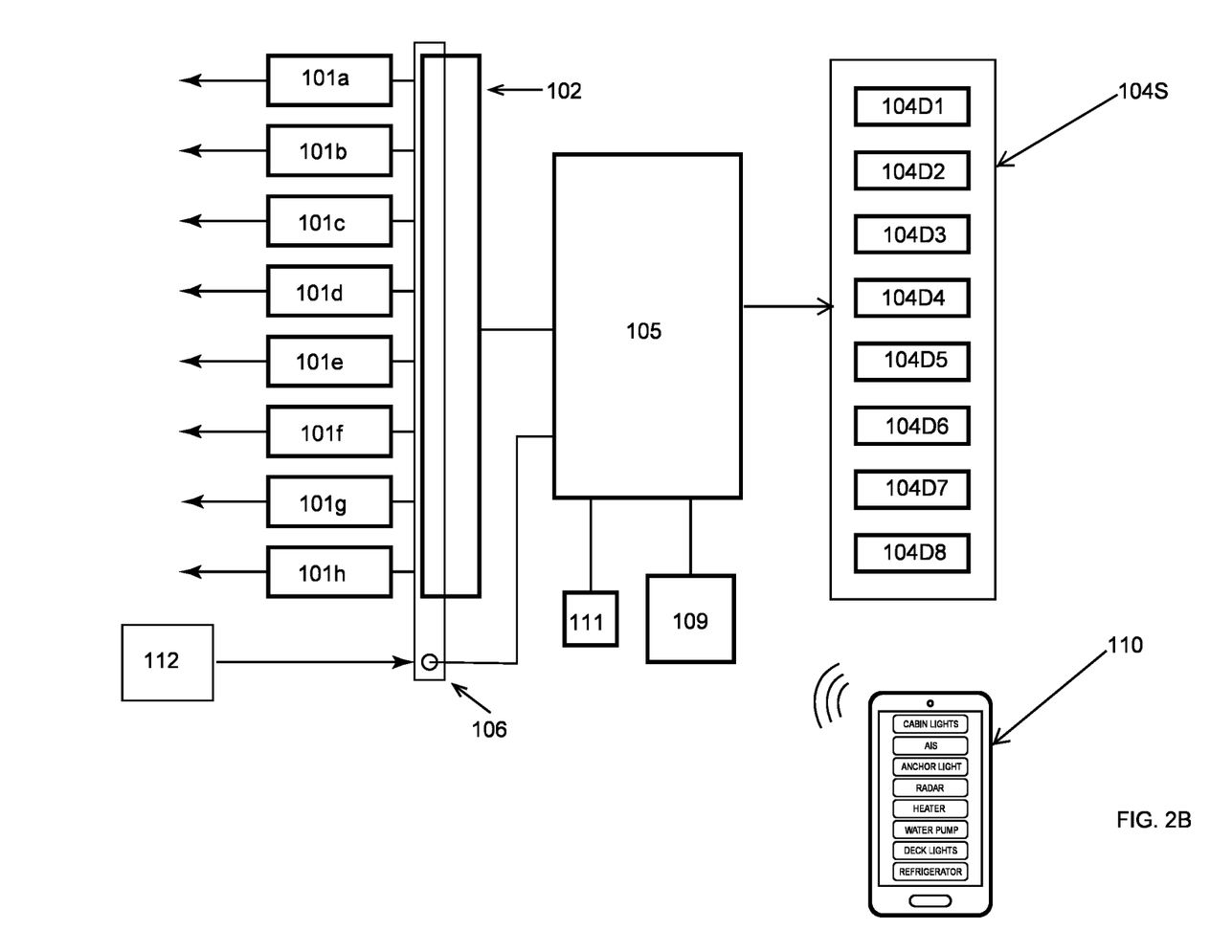
FIG. 2B illustrates a block diagram of a configurable electrical distribution panel according to one embodiment of the present invention.
Figure 2C:
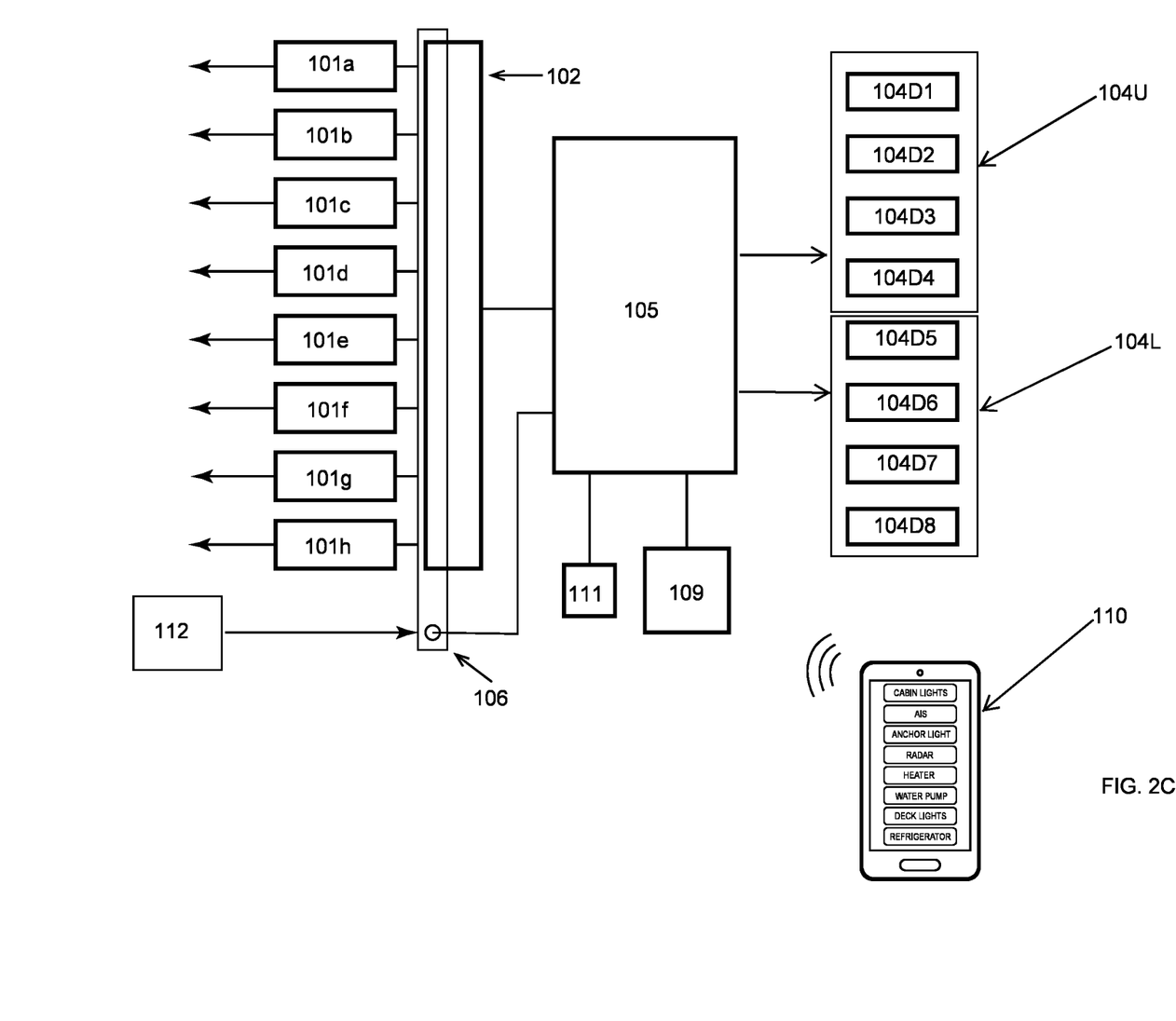
FIG. 2C illustrates a block diagram of a configurable electrical distribution panel according to one embodiment of the present invention.

Each of FIG. 2A, FIG. 2B, and FIG. 2C illustrates a block diagram of a configurable electrical distribution panel 100 according to one embodiment of the present invention. Please refer to FIG. 2A, FIG. 2B, and FIG. 2C.

In one embodiment, the at least one sensor board is connected to the circuit breakers 101*a*, 101*b*, 101*c*, 101*d*, 101*e*, 101*f*, 101*g*, 101*h* via a bus bar 106, wherein a power supply 112 is connected to the bus bar 106 via a power cable 108, as shown in FIG. 2A.

In one embodiment, the at least one sensor board is attached to a bus bar for performing contactless current measurement of each of the circuit breakers 101*a*, 101*b*, 101c, 101d, 101e, 101f, 101g, 101h, wherein a power supply is connected to the bus bar 106 via a power cable 108, as shown in FIG. 2A.

In one embodiment, the power supply 112 is a DC power supply.

In one embodiment, the power supply 112 is an AC power supply.

In one embodiment, the control circuit 105 has a USB interface for connecting with a USB device 111.

In one embodiment, the control circuit 105 has an interface for connecting with an antenna 109.

In one embodiment, the control circuit 105 has an interface for connecting with the CAN bus and/or NMEA networks.

In one embodiment, the EPD display areas retain the names of circuit branches even if the external power supply is off, regardless if intentionally or as a result of some power outage or failure.

In one embodiment, the panel can retrofit the existing panels, providing more functionality and safety to the user.

In one embodiment, wherein the at least one EPD (Electronic Paper Display) 104 has a plurality of EPD(s) 104a, 104b, 104c, 104d, 104e, 104f, 104g, 104h, wherein each circuit breaker 101a, 101b, 101c, 101d, 101e, 101f, 101g, 101h has a separated EPD 104a, 104b, 104c, 104d, 104e, 104f, 104g, 104h for display information, respectively, as shown in FIG. 2A.

In one embodiment, the at least one EPD 104 has two separate EPD(s) 104U, 104L, wherein the two separate EPD(s) 104U, 104L are divided into a plurality of display areas 104D1, 104D2, 104D3, 104D4, 104D5, 104D6, 104D7, 104D8 for displaying information associated with the plurality of circuit breakers 101a, 101b, 101c, 101d, 101e, 101f, 101g, 101h, wherein each circuit breaker 101a, 101b, 101c, 101d, 101e, 101f, 101g, 101h has a separated display area 104D1, 104D2, 104D3, 104D4, 104D5, 104D6, 104D7, 104D8 for display information, respectively, as shown in FIG. 2B.

In one embodiment, the at least one EPD 104 has a single separate EPD 104S, wherein the single separate EPD 104S is divided into a plurality of display areas 104D1, 104D2, 104D3, 104D4, 104D5, 104D6, 104D7, 104D8 for displaying information associated with the plurality of circuit breakers 101a, 101b, 101c, 101d, 101e, 101f, 101g, 101h, wherein each circuit breaker 101a, 101b, 101c, 101d, 101e, 101f, 101g, 101h has a separated display area 104D1, 104D2, 104D3, 104D4, 104D5, 104D6, 104D7, 104D8 for display information, respectively, as shown in FIG. 2C.

Figure 3A:
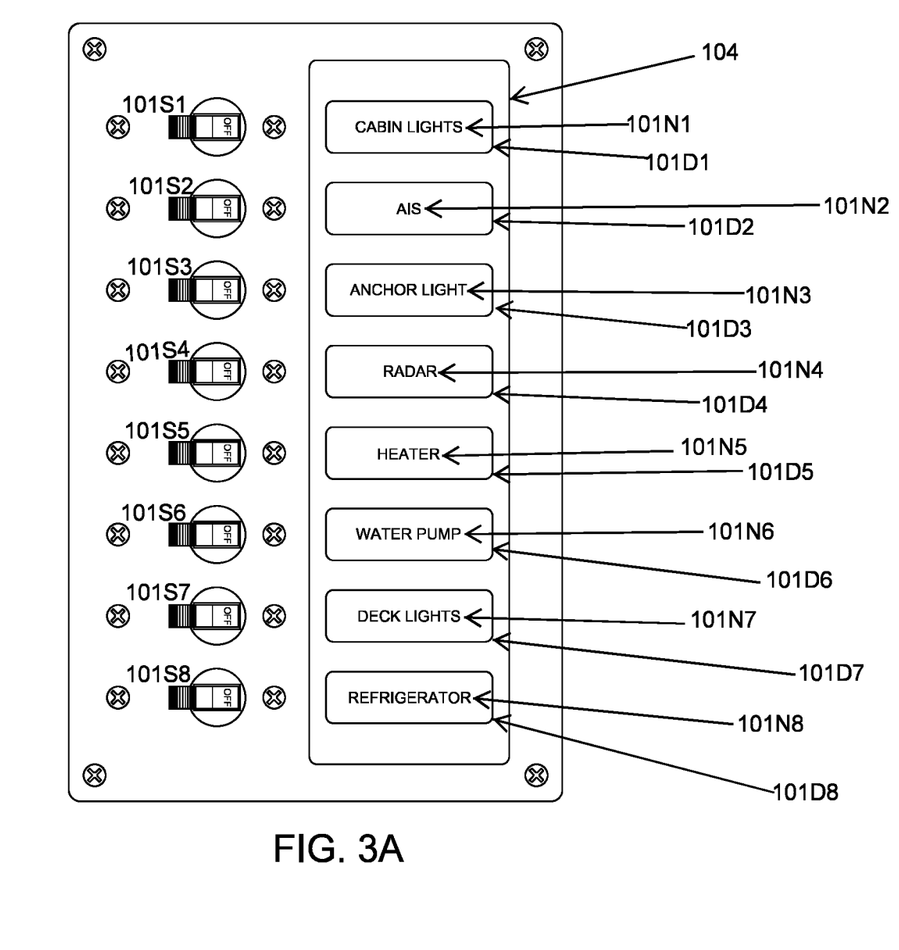
FIG. 3A illustrates the structure of the panel of the configurable electrical distribution panel according to one embodiment of the present invention.

FIG. 3A illustrates the structure of the panel 103 of a configurable electrical distribution panel 100 according to one embodiment of the present invention, wherein a plurality of switches 101S1, 101S2, 101S3, 101S4, 101S5, 101S6, 101S7, 101S8 are on the panel 103 and a plurality of display areas 104D1, 104D2, 104D3, 104D4, 104D5, 104D6, 104D7, 104D8 of the at least one EPD 104 are on the panel 103, wherein a corresponding name 104N1, 104N2, 104N3, 104N4, 104N5, 104N6, 104N7, 104N8 is configured and displayed on each display area 104D1, 104D2, 104D3, 104D4, 104D5, 104D6, 104D7, 104D8 of the at least one EPD 104. That is, all of the branch names 104N1, 104N2, 104N3, 104N4, 104N5, 104N6, 104N7, 104N8 associated with the loads can be configured and displayed on the display areas 104D1, 104D2, 104D3, 104D4, 104D5, 104D6, 104D7, 104D8 of the at least one EPD 104.

Figure 3B:
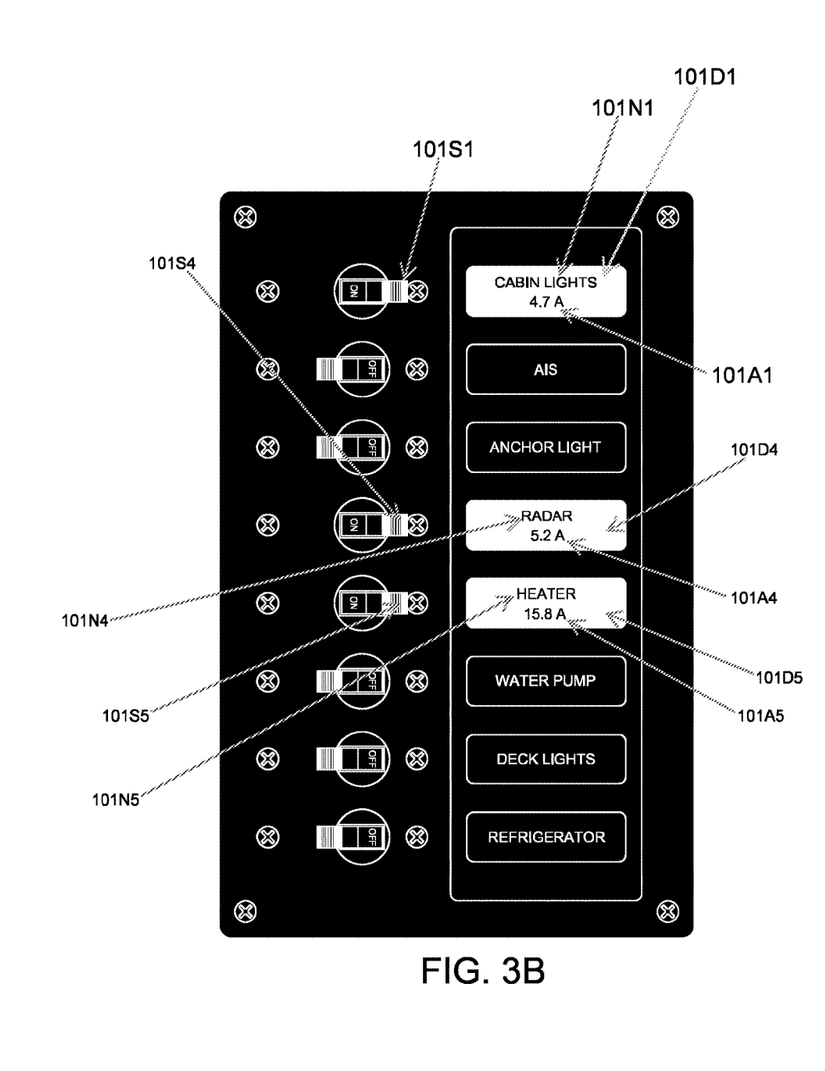
FIG. 3B illustrates a working condition of the panel of the configurable electrical distribution panel according to one embodiment of the present invention.
Figure 3C:
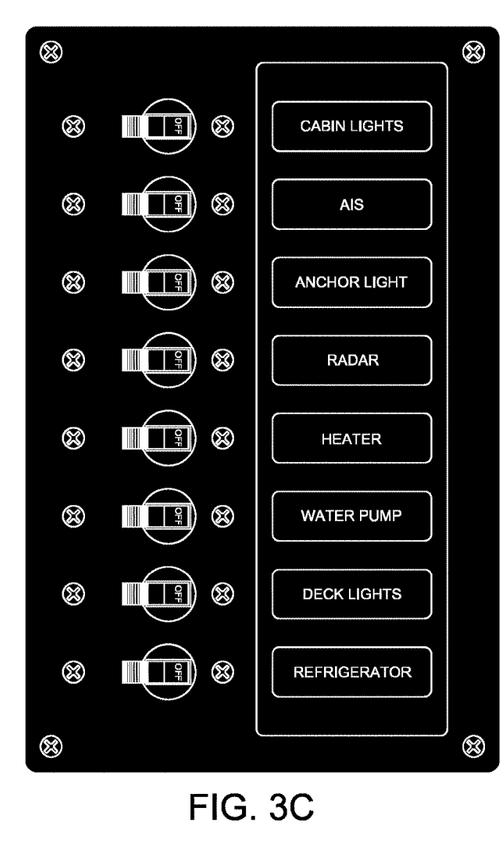
FIG. 3C illustrates another working condition of the panel of the configurable electrical distribution panel according to one embodiment of the present invention.

FIG. 3C illustrates a working condition according to one embodiment of the present invention, when the panel 103 is powered, all of the branches are off, and the background color of each display area 104D1, 104D2, 104D3, 104D4, 104D5, 104D6, 104D7, 104D8 is black. In one embodiment, the background color of each display area 104D1, 104D2, 104D3, 104D4, 104D5, 104D6, 104D7, 104D8 is black when there is no power applied to the panel 103.

FIG. 3B illustrates a working condition of the panel 103 according to one embodiment of the present invention, when the panel 103 is powered, some of the branches are on and some of the branches are off. The background color of the display area 104D1 changes from black to white when the branch corresponding to the load name 104N1 is turned on, wherein a first amount of current 101A1 flowing through the first circuit breaker 101a having the first on/off switch 101S1 is also displayed on the display area 104D1. Likewise, the background color of the display area 104D4 changes from black to white when the branch corresponding to the load name 104N4 is turned on, wherein a second amount of current 101A4 flowing through the fourth circuit breaker 101d having the fourth on/off switch 101S4 is also displayed on the display area 104D4; and the background color of the display area 104D5 changes from black to white when the branch corresponding to the load name 104N5 is turned on, wherein a third amount of current 101A5 flowing through the fifth circuit breaker 101e having the fifth on/off switch 101S5 is also displayed on the display area 104D5.

In one embodiment, the APP is capable of configuring the at least one EPD 104 into a plurality of display areas 104D1, 104D2, 104D3, 104D4, 104D5, 104D6, 104D7, 104D8 and assigning a corresponding branch name 104N1, 104N2, 104N3, 104N4, 104N5, 104N6, 104N7, 104N8 for each circuit breaker for displaying on a corresponding display area of the circuit breaker.

Figure 4:
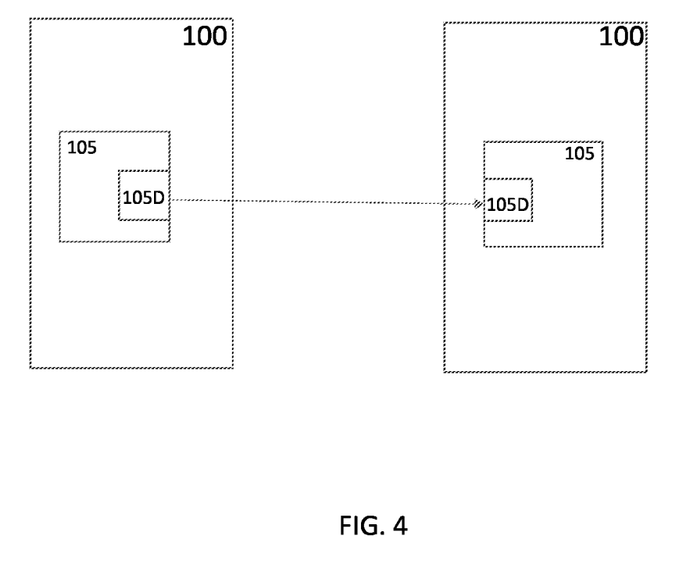
FIG. 4 illustrates a daisy chain connection between two configurable electrical distribution panels.

In one embodiment, as shown in FIG. 4, the control circuit 105 of the configurable electrical distribution panel 100 has an interface 105D for forming a daisy chain connection with another configurable electrical distribution panel(s).

The foregoing descriptions of specific embodiments of the present invention have been presented for purposes of illustrations and description. They are not intended to be exclusive or to limit the invention to the precise forms disclosed, and obviously, many modifications and variations are possible in light of the above teaching. The embodiments were chosen and described to best explain the principles of the invention and its practical application, thereby enabling others skilled in the art to best utilize the invention and various embodiments with various modifications as are suited to the particular use contemplated. It is intended that the scope of the invention be defined by the claims appended hereto and their equivalents.

What is claimed is:

1. A configurable electrical distribution panel, comprising:
   a plurality of circuit breakers, wherein each circuit breaker of the plurality of circuit breakers comprises a first terminal, a second terminal, and an on/off switch, wherein when the on/off switch is on, the first terminal is electrically connected to the second terminal for conducting a current through each circuit breaker of the plurality of circuit breakers;
   a plurality of current sensors, wherein each current sensor is coupled to each circuit breaker of the plurality of circuit breakers, respectively, for measuring an amount of current flowing through each circuit breaker of the plurality of circuit breakers;
   a panel, for operating each of the on/off switches of the plurality of circuit breakers, wherein at least one EPD (Electronic Paper Display) that is separated from the plurality of circuit breakers is disposed on the panel, wherein the at least one EPD comprises a plurality of display areas, each display area of the plurality of display areas corresponding to each circuit breaker of the plurality of circuit breakers, respectively, for displaying information associated with the each circuit breaker of the plurality of circuit breakers; and a control circuit, comprising a plurality of electronic devices that are electrically connected, wherein the control circuit is configured to obtain the amount of current flowing through each circuit breaker of the plurality of circuit breakers via the plurality of current sensors and display the amount of current flowing through each circuit breaker of the plurality of circuit breakers, respectively.

2. The configurable electrical distribution panel as claimed in claim 1, wherein the configurable electrical distribution panel comprises a PCB (Printed Circuit Board), wherein the plurality of electronic devices are disposed on the PCB for forming the control circuit.

3. The configurable electrical distribution panel as claimed in claim 2, wherein the plurality of current sensors are disposed on at least one sensor board that is electrically coupled to the PCB.

4. The configurable electrical distribution panel as claimed in claim 3, wherein the plurality of current sensors are, respectively, connected to the first and/or second terminals of each circuit breaker of the plurality of circuit breakers via a bus bar for measuring an amount of current flowing through each circuit breaker of the plurality of circuit breakers, wherein the bus bar comprises a terminal for connecting to a power supply.

5. The configurable electrical distribution panel as claimed in claim 3, wherein the at least one sensor board is attached to a bus bar for performing contactless measurement of current flowing through each circuit breaker of the plurality of circuit breakers, wherein the bus bar comprises a terminal for connecting to a power supply.

6. The configurable electrical distribution panel as claimed in claim 5, wherein the power supply is a DC power supply or an AC power supply.

7. The configurable electrical distribution panel as claimed in claim 1, wherein the first terminal of a first circuit breaker is electrically connected to a power supply and the second terminal of the first circuit breaker is electrically connected to a first load on a boat, wherein when a first on/off switch of the first circuit breaker is turned on, the control circuit obtains a first amount of current flowing through the first circuit breaker and displays the first amount of current on a first display area of the at least one EPD with a background color of the first display area of the at least one EPD being changed from black to white to indicate that a circuit branch corresponding to the first circuit breaker is energized.

8. The configurable electrical distribution panel as claimed in claim 1, wherein the first terminal of a first circuit breaker is electrically connected to a power supply and the second terminal of the first circuit breaker is electrically connected to a first load on a motorhome, wherein when a first on/off switch of the first circuit breaker is turned on, the control circuit obtains a first amount of current flowing through the first circuit breaker and displays the first amount of current on a first display area of the at least one EPD with a background color of the first display area of the at least one EPD being changed from black to white to indicate that a circuit branch corresponding to the first circuit breaker is energized.

9. The configurable electrical distribution panel as claimed in claim 1, wherein the control circuit comprises an interface for forming a daisy chain connection with another configurable electrical distribution panel.

10. The configurable electrical distribution panel as claimed in claim 1, wherein the configurable electrical distribution panel comprises a plurality of voltage sensors, wherein each voltage sensor is electrically connected to each circuit breaker of the plurality of circuit breakers, respectively, for measuring a voltage at first or second terminal of each circuit breaker of the plurality of circuit breakers.

11. The configurable electrical distribution panel as claimed in claim 1, wherein each on/off switch is a toggle switch, a button switch, a rocker switch or a rotary switch.

12. The configurable electrical distribution panel as claimed in claim 1, wherein the control circuit updates the at least one EPD according to information received from an external device via a USB or wireless connection established between the control circuit and the external device.

13. The configurable electrical distribution panel as claimed in claim 12, wherein the external device is a smartphone, wherein an APP (Application) running on the smartphone communicates with the control circuit via the wireless connection for configuring the panel.

14. The configurable electrical distribution panel as claimed in claim 13, wherein the APP sends information for displaying on the at least one EPD in a language selected through a user interface of the APP.

15. The configurable electrical distribution panel as claimed in claim 13, wherein the APP configures the at least one EPD into the plurality of display areas and assigns a corresponding circuit branch name for each circuit breaker of the plurality of circuit breakers for displaying on each display area of the plurality of display areas, respectively.

16. The configurable electrical distribution panel as claimed in claim 15, wherein each display area of the plurality of display areas retains the corresponding circuit branch name when the configurable electrical distribution panel is powered off.

17. The configurable electrical distribution panel as claimed in claim 1, wherein when the amount of current flowing through any circuit breaker of the plurality of circuit breakers exceeds a predefined threshold, an alarm is generated by the control circuit and a warning symbol or message is displayed on the at least one EPD.

18. The configurable electrical distribution panel as claimed in claim 1, wherein the control circuit has an interface for connecting with a CAN bus.

19. The configurable electrical distribution panel as claimed in claim 1, wherein the control circuit has an interface for connecting with an NMEA network.

* * * * *